US009098824B2

(12) United States Patent
Jones et al.

(10) Patent No.: US 9,098,824 B2
(45) Date of Patent: Aug. 4, 2015

(54) ORPHANED PRODUCT STRAY ANALYSIS USING RFID

(71) Applicant: Wal-Mart Stores, Inc., Bentonville, AR (US)

(72) Inventors: Nicholaus Adam Jones, Fayetteville, AR (US); Jarrod Lee Bourlon, Centerton, AR (US); Thomas Edward Stiefel, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/861,958

(22) Filed: Apr. 12, 2013

(65) Prior Publication Data
US 2014/0263635 A1 Sep. 18, 2014

Related U.S. Application Data

(60) Provisional application No. 61/790,009, filed on Mar. 15, 2013.

(51) Int. Cl.
*G06F 19/00* (2011.01)
*G06Q 30/00* (2012.01)
*G06Q 90/00* (2006.01)
*G06Q 10/08* (2012.01)

(52) U.S. Cl.
CPC .................... *G06Q 10/087* (2013.01)

(58) Field of Classification Search
CPC ......... G06K 17/00; G06K 7/10; G06K 15/00; G06Q 10/087; G06Q 20/203; G06Q 30/02
USPC ................... 235/385, 383, 375, 487, 462.46, 235/472.02; 340/572.1
See application file for complete search history.

(56) References Cited

U.S. PATENT DOCUMENTS

| | | | |
|---|---|---|---|
| 6,903,656 B1 | 6/2005 | Lee | |
| 7,602,288 B2 * | 10/2009 | Broussard | 340/572.1 |
| 2003/0216969 A1 * | 11/2003 | Bauer et al. | 705/22 |
| 2005/0049914 A1 * | 3/2005 | Parish | 705/14 |
| 2006/0192003 A1 | 8/2006 | Chung | |

(Continued)

OTHER PUBLICATIONS

International Search Report and Written Opinion issued in International Application No. PCT/US2014/026698, dated Oct. 2, 2014.

*Primary Examiner* — Edwyn Labaze
(74) *Attorney, Agent, or Firm* — McCarter & English, LLP; David R. Burns

(57) ABSTRACT

A computer-implemented method of managing inventory includes receiving, at an antenna operatively coupled to a radio-frequency identification (RFID) reader, product identification information encoded in an RF signal transmitted by a plurality of RFID tags. Each of the RFID tags is associated with a respective one of a plurality of products. The method further includes processing, by a processor, the product identification information contained in a portion of the encoded RF signal to identify a characteristic associated with each of the products, and identifying, by the processor using the product identification information, one of the products having a characteristic different from another one of the products. The method may include identifying a majority of the products having a characteristic in common based on the product identification information, and identifying at least one of the products having a characteristic different from the majority.

17 Claims, 6 Drawing Sheets

(56) References Cited

U.S. PATENT DOCUMENTS

| | | |
|---|---|---|
| 2006/0232382 A1 | 10/2006 | Bauer et al. |
| 2009/0231135 A1* | 9/2009 | Chaves et al. .............. 340/572.1 |
| 2010/0019035 A1* | 1/2010 | Larson et al. ................. 235/385 |
| 2012/0086553 A1 | 4/2012 | Wilkinson et al. |
| 2012/0086554 A1 | 4/2012 | Wilkinson et al. |
| 2012/0161967 A1* | 6/2012 | Stern .......................... 340/572.1 |
| 2012/0235817 A1 | 9/2012 | Forster |
| 2013/0049925 A1* | 2/2013 | Subramanian ................. 340/3.1 |

* cited by examiner

ORPHANED PRODUCT STRAY ANALYSIS USING RFID

CROSS-REFERENCE TO RELATED APPLICATIONS

This application claims priority under 35 U.S.C. §119(e) to U.S. Provisional Patent Application Ser. No. 61/790,009, entitled "ORPHANED PRODUCT STRAY ANALYSIS USING RFID" and filed on Mar. 15, 2013, which is hereby incorporated by reference in its entirety.

BACKGROUND

Embodiments of the disclosure relate generally to data processing, and more particularly to methods and systems for identifying misplaced and/or orphaned products or other goods using radio-frequency identification tags.

Radio-frequency identification (RFID) has been used for inventory management, i.e., by reading identification information stored on RFID tags attached to various objects, such as retail products. RFID is a wireless, non-contact system that uses radio-frequency electromagnetic fields to transfer data from a tag attached to an object for automatic identification and tracking. A conventional RFID system includes one or more RFID tags and an RFID reader. Each RFID tag includes a transponder having a radio frequency integrated circuit (RFIC) and an antenna for receiving an interrogation signal from the RFID reader and emitting a response signal. The RFIC can store identification information or other data and output such data in the response signal upon receiving the interrogation signal. The RFID reader includes an antenna and a transceiver. The transceiver includes a transmitter, a receiver, and a decoder for processing data in the signal emitted by the RFID tag. The RFID reader can be a mobile, handheld device, or the RFID reader can be mounted in a fixed location, depending on the particular application. When the antenna of the RFID reader is within an effective range for activating the transponder, the transponder is activated by the electromagnetic field from the antenna of the RFID reader. Data can be transmitted by the transponder in the RFID tag to the transceiver of the RFID reader wirelessly. The transceiver of the RFID reader can decode the data received from the transponder. The decoded information can be processed by the RFID reader or transmitted to another computing device for processing.

RFID tags may include active, passive, or semi-active transponders. Active and semi-active transponders are powered by a battery, while passive transponders obtain power from the interrogation signal emitted by the RFID reader. Active transponders can initiate communication with an RFID reader, whereas passive and semi-passive transponders are typically activated only when interrogated by the RFID reader. Multiple RFID tags may be located in the same radio frequency field and may be read one at a time or simultaneously.

SUMMARY

According to various embodiments, RFID tag data can be used to identify a misplaced or orphaned product or good using, for example, pattern matching based on one or more characteristics of several products or goods each having an RFID tag. For example, if several products have a common characteristic that is different than a characteristic of one other product, the one other product may be considered misplaced or orphaned based at least in part on the RFID tag data.

According to an embodiment, a computer-implemented method of managing inventory includes receiving, at an antenna operatively coupled to a radio-frequency identification (RFID) reader, product identification information encoded in an RF signal transmitted by a plurality of RFID tags. Each of the RFID tags is associated with a respective one of a plurality of products. The method further includes processing, by a processor, the product identification information contained in a portion of the encoded RF signal to identify a characteristic associated with each of the products, and identifying, by the processor using the product identification information, one of the products having a characteristic different from another one of the products.

In some embodiments, determining the characteristic may include retrieving, by the processor from a database, machine-readable product data representing the characteristic associated with the respective one of the products. In some embodiments, the characteristic may include a product stock keeping unit (SKU) number, a manufacturer product number, a brand identifier, a model identifier, a product category, a department number, a package quantity, a package identifier, a style, a season, a size, and/or a color. In some embodiments, the product identification information may include a product stock keeping unit (SKU) number, a manufacturer product number, a brand identifier, a model identifier, and/or a product name.

In some embodiments, the method may further include identifying, by the processor using the product identification information, a majority of the products having a characteristic in common, and identifying the at least one of the products having a characteristic different from the majority. In some embodiments, the method may further include displaying, by the processor via a display, information representing at least one of the items having the characteristic different from at least two other products. In some embodiments, the product identification information may be read over a predetermined period of time.

According to an embodiment, an inventory management system includes a programmable processor, and a memory operatively coupled to the processor. The memory has stored thereon computer-executable instructions that when executed by the processor cause the processor to receive, at an antenna operatively coupled to a radio-frequency identification (RFID) reader, product identification information encoded in an RF signal transmitted by a plurality of RFID tags. Each of the RFID tags is associated with a respective one of a plurality of products. The memory has further stored thereon computer-executable instructions that when executed by the processor cause the processor to process the product identification information contained in a portion of the encoded RF signal to identify a characteristic associated with each of the products, and identify, using the product identification information, one of the products having a characteristic different from another one of the products.

In some embodiments, the memory may further include instructions that when executed by the processor cause the processor to determine the characteristic by retrieving, from a database, machine-readable product data representing the characteristic associated with the respective one of the plurality of products. In some embodiments, the memory may further include instructions that when executed by the processor cause the processor to identify, using the product identification information, a majority of the products having a characteristic in common based on the product identification information, and identify the at least one of the products having a characteristic different from the majority.

In some embodiments, the memory may further include instructions that when executed by the processor cause the processor to display, via a display, information representing the at least one of the items having the characteristic different from at least two other products.

According to an embodiment, a non-transitory computer-readable medium has stored thereon computer-executable instructions that when executed by a computer cause the computer to receive, at an antenna operatively coupled to a radio-frequency identification (RFID) reader, product identification information encoded in an RF signal transmitted by a plurality of RFID tags, process a portion of the encoded RF signal to identify a characteristic associated with each of a plurality of products based on the product identification information, and identify, using the product identification information, one of the products having a characteristic different from another one of the products. Each of the plurality of RFID tags is associated with a respective one of the products.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to various embodiments, computer-implemented methods, computer-readable media and physical inventory management systems are disclosed for identifying misplaced or orphaned products or other goods using radio frequency identification (RFID) tags.

As used herein, the terms misplaced and orphaned each refer to one or more items that are located in an undesired location within a retail store; that is, a misplaced item is an item that is not where it is supposed to be. While conventional inventory tracking techniques use RFID technology to manage inventory supplies in a particular retail store, these techniques do not identify products or other goods that are misplaced or orphaned.

Figure 1:
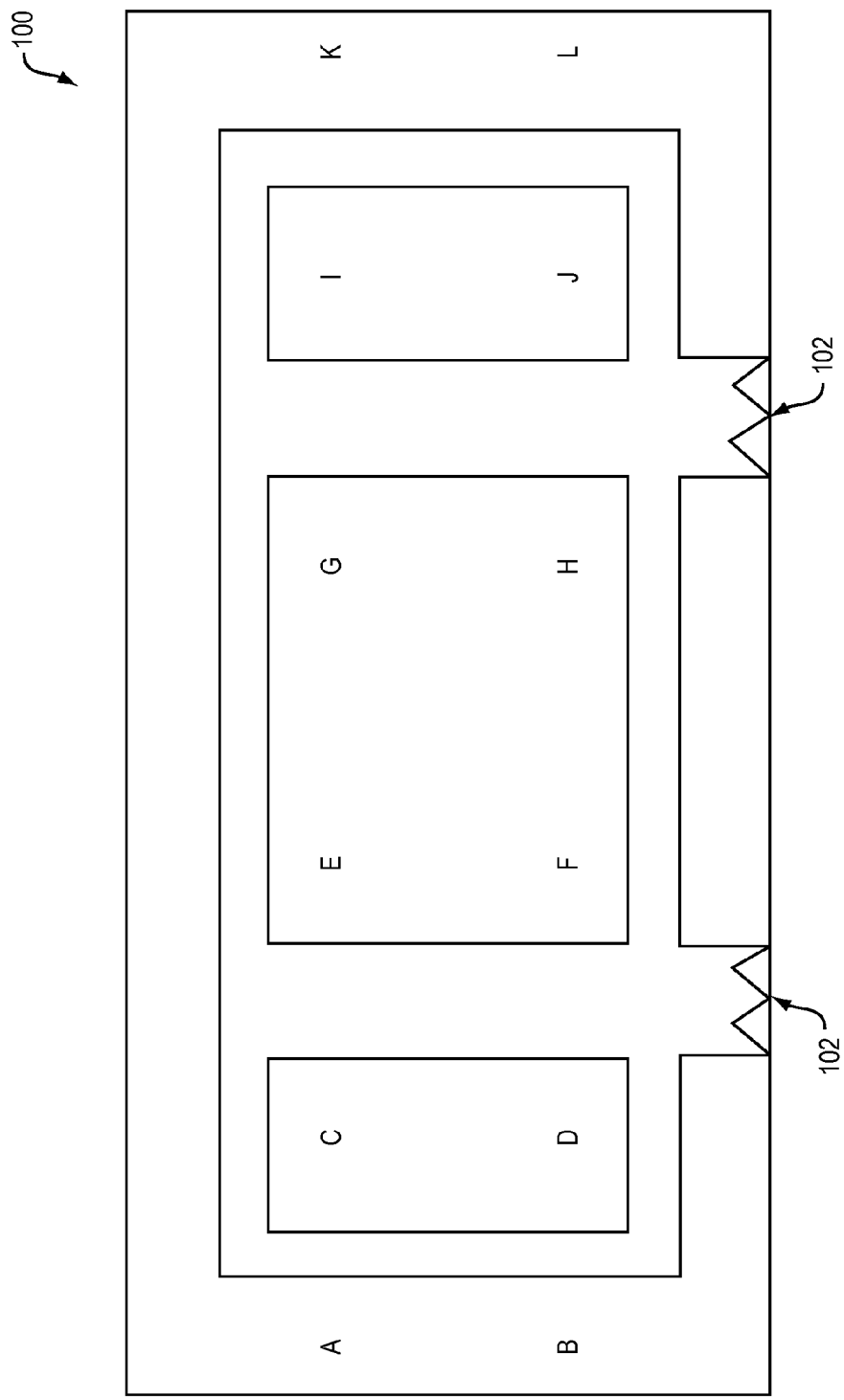
FIG. 1 depicts an example plan view of a retail store for illustrating certain aspects of some embodiments described herein.

In a retail environment, various products or other goods are usually stocked at specific locations within a store. FIG. 1 depicts a plan view of an exemplary retail store 100 having various locations (e.g., departments) indicated at A-L throughout the store. Merchandise items may be stocked at any location A-L in the store 100. It will be understood that the store 100 may include any number of distinct locations for stocking merchandise items. For example, men's clothing may be stocked in one location while women's clothing may be stocked in a different location. Furthermore, often multiple units of the same products are stocked together, for example, twenty pairs of Brand A men's jeans may be arranged in one pile on a display shelf, and another twenty pairs of Brand B men's jeans may be arranged in a separate pile on the same shelf or a different display shelf in the same department.

In one example, multiple items of one product may be preferably stocked in one or more usual locations, such as men's clothing in the men's clothing department A, and women's clothing in the women's clothing department B. Certain products may be stocked in more than one location (e.g., departments A and F), or temporarily moved to a different location, such as a more prominent location near a store entrance 102 during a promotional event. Any item that is not in one of the usual locations for that item is considered to be misplaced or orphaned. For instance, this occurs when a customer picks up an item from its usual location (e.g., Department A), and then goes to a different part of the store (e.g., Department B). While at the different location, the customer decides not to purchase the item and places it on a nearby shelf, at which point the item may be considered misplaced or orphaned.

Figure 2:
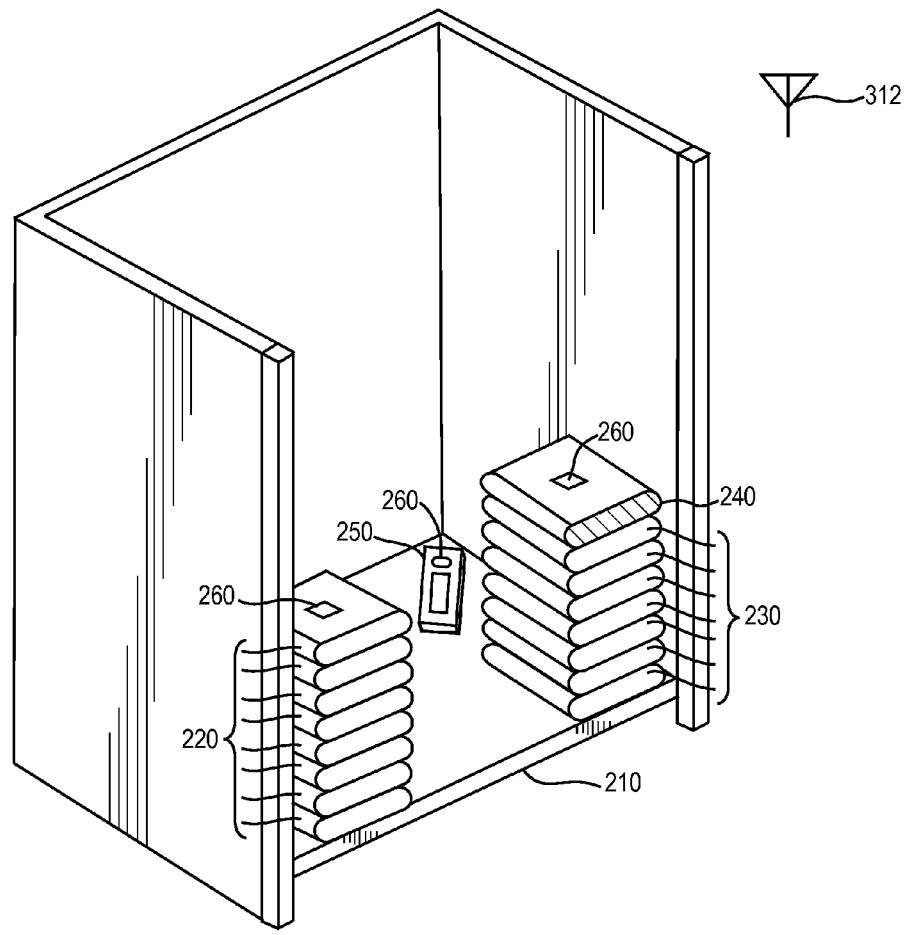
FIG. 2 depicts an example perspective view of a shelf containing various RFID-tagged products for illustrating certain aspects of some embodiments described herein.

FIG. 2 is a perspective view of an exemplary retail store shelf 210 upon which various merchandise items 220, 230, 240 and 250 are placed. The shelf 210 may, for example, be located in any one of the departments A-L in the store 100 of FIG. 1. In this example, the shelf 210 contains eight pairs of Brand A men's jeans 220, five pairs of Brand B men's jeans 230, one pair of Brand C women's jeans 240, and a package of playing cards 250. RFID tags 260 attached to each item contain product identification data that, when read, or scanned, by an RFID reader located within the reading range of the RFID tags, can be used to identify individual units of stock. The data may include, but not be limited to, transponder identification, product identification, location information, Universal Product Codes (UPC), and/or Electronic Product Codes (EPC). The EPC is a standardized identifier that provides a permanent and unique digital, machine-readable identity for all products. In some embodiments, each RFID tag 260 includes a transponder that is configured to emit a machine-readable signal containing the product identification data for uniquely identifying the item and/or location of the item to which it is attached. The transponder can be active, passive or battery assisted passive. If the transponder is passive or battery assisted passive, and power can be applied (e.g., to an antenna within range of the RFID tag) to provoke the RFID tag to emit a signal. If the RFID tag is active, such power may not be necessary.

Figure 3:
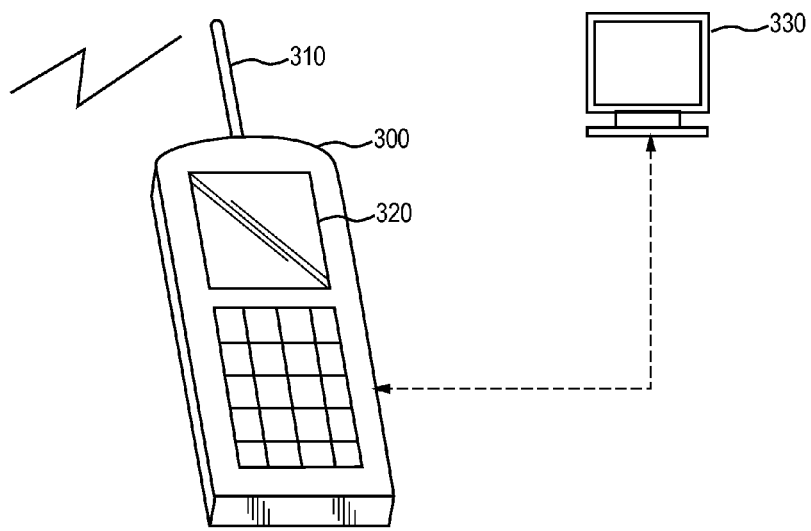
FIG. 3 depicts an example of an RFID reader, antenna and computing device, in accordance with some embodiments.

FIG. 3 depicts an exemplary RFID reader 300. In some embodiments, the RFID reader can be mobile (e.g., handheld), having an antenna 310 for receiving the product identification information stored in the RFID tag and a display 320 for displaying the product identification information or other information, such as an indication of whether an item is misplaced or orphaned, to a user. The RFID reader 300 can, in some embodiments, further identify the location (e.g., Department A-L) in which it is being used. The RFID reader 300 may, for example, include a R1000/R2000 RFID integrated circuit (IC) chip, manufactured by Impinj, Inc. of Seattle, Wash. The RFID reader 300 can be configured to receive and process the signal emitted by the RFID tag 260 while the antenna 310 is within reading range of the signal. In some embodiments, the antenna can be separate from the RFID reader 300, for example, antenna 312, which can be mounted on a wall, shelf or ceiling, and remotely connected to the RFID reader. In some embodiments, the RFID reader 300 is not mobile, but instead in a fixed location.

In operation, the RFID reader 300 communicates with the RFID tags 260 in a conventional manner. For example, with a passive RFID tag 260, the RFID reader 300 interrogates and powers the RFID tag 260 so that the RFID tag 260 communicates information stored in the RFID tag 260 to the RFID reader 300. The RFID reader 300 then processes the information and/or transmits the information to a remote computer 330 for further processing.

Each RFID reader 300 can be associated with a reader antenna, such as antenna 310 (e.g., via a wired connection) or fixed position antenna 312 (e.g., via a wireless connection). In an embodiment, the RFID reader 300 is a handheld, mobile unit that can be carried to different locations A-L in the retail store 100. The associated antenna 310 is placed into proximity of the reading range of the RFID tags 260, and the RFID tags 260 are read. In another embodiment, the RFID reader 300 is mobile, but the associated antenna 310 is located in a fixed position within reading range of the RFID tags 260. In yet another embodiment, the RFID reader 300 is located in a fixed position and connected (e.g., through a communication network) with the fixed position antenna 312. The size and configuration of the antennas 310 and 312 can be designed to provide various reading ranges (e.g., one antenna for coverage of the entire shelf 210 or multiple antennas for coverage of different portions of the shelf 210), as will be understood by one of skill in the art.

The RFID reader 300 can extract and process the product identification data, or other data (e.g., a transponder identification code), contained in the signal. In some embodiments, the product identification data may include, for example, a stock keeping unit (SKU) number, an Electronic Product Code, a manufacturer product number, a brand identifier, a model identifier, a product category, a department number, a style, a package quantity (e.g., six units per package, twelve units per package, etc.), a pack type identifier, a season, a size, and/or a color associated with the product to which the RFID tag is attached. In some other embodiments, the data received from the RFID tag can be used to identify the product in other ways, such as by cross-referencing the RFID tag data to product data stored in a database. The product data may include one or more characteristics associated with the product, such as brand name, product name or model number, product category (e.g., men's pants, vitamins, paper towels, etc.), SKU number, manufacturer identification number, or other characterizing information. In the example of FIG. 2, items 220 and 230 are both men's jeans, while items 240 is a pair of women's jeans and item 250 is a pack of playing cards. Accordingly, all of the items 220 and 230 share a common characteristic, i.e., they are all men's jeans, while items 240 (women's jeans) and 250 (playing cards) are not men's jeans. In this example, it is therefore likely that either or both of items 240 and 250 are misplaced or orphaned because they are located on the same shelf 210 as the men's jeans 220 and 230, which have a characteristic in common.

The product identification data received from the RFID tag 260 can be collected and analyzed, e.g., using pattern matching, to identify misplaced or orphaned items. Generally, the product identification data is received from each of the RFID tags 260 over a limited period of time (e.g., several seconds or minutes) and/or while the RFID reader 300 is in a substantially static location so as to avoid reading RFID tags from other products in different locations (e.g., if the RFID reader 300 or antenna 310 is moved to a different location). It may, for example, be presumed that the RFID tags 260 do not move substantially while the product identification data is being acquired by the RFID reader 300. If multiple items 220, 230, 240, 250 have a characteristic in common, or any other distinctive comparison that can be obtained using the product identification information, it can be determined whether any of the items 220, 230, 240, 250 having a different characteristic among all of the items scanned by the RFID reader are, or are likely to be, misplaced or orphaned. One or more characteristics associated with the items 220, 230, 240, 250 may be determined, for example, using the product identification data directly or by cross-referencing the product identification information with product characteristics stored in a database. For example, a product may be associated with characteristics such as brand name, model number, SKU number, and/or manufacturer identification number.

Figure 4:
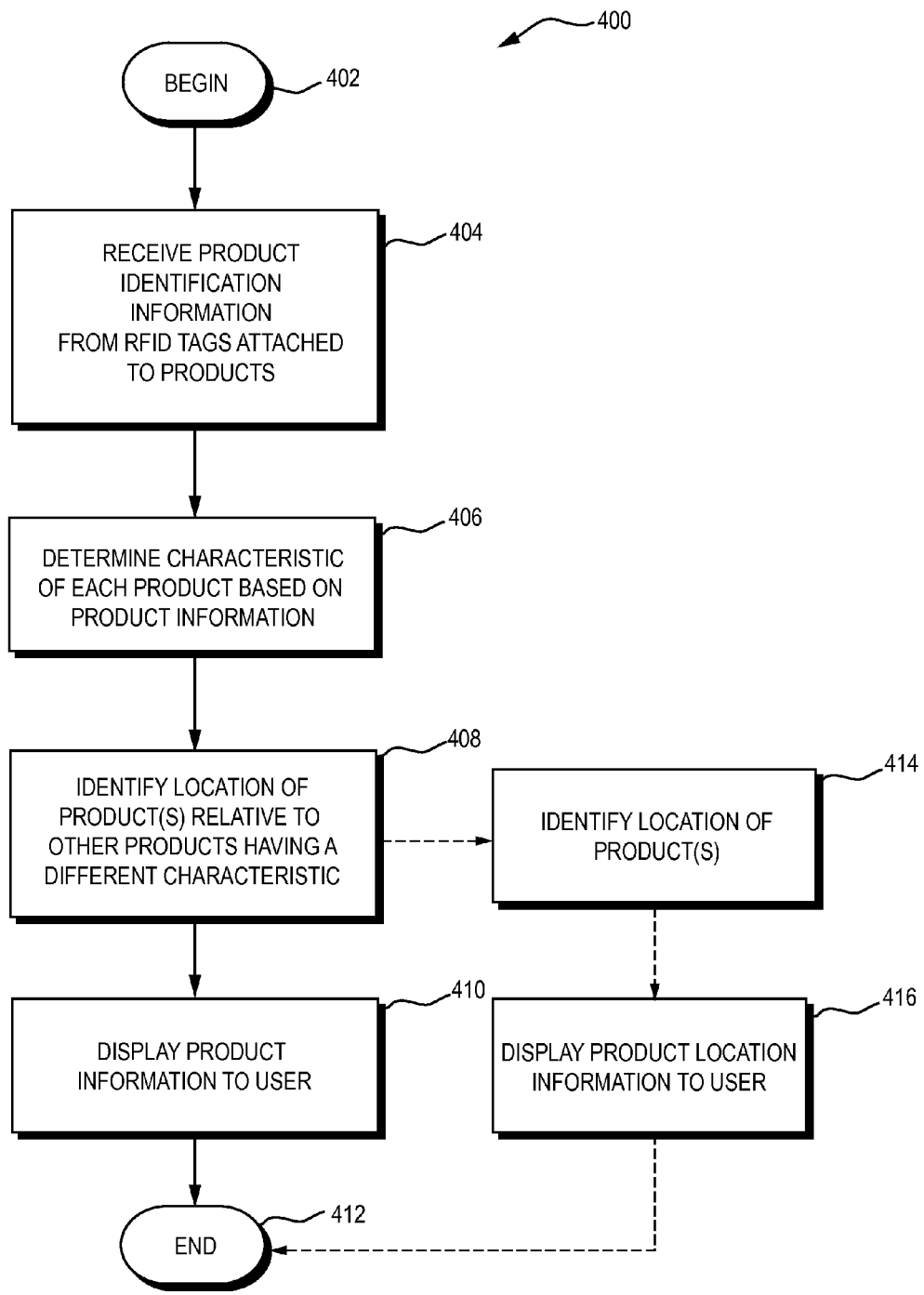
FIG. 4 is an example flow diagram of a process of identifying misplaced or orphaned items, in accordance with an embodiment.

FIG. 4 is a flow diagram of one example of a computer-executable process 400 for identifying misplaced or orphaned products using RFID tags. Process 400 begins at step 402. At step 404, product identification information, or other data that can be used to uniquely identify a product, is received from a plurality of RFID tags (e.g., RFID tag 260 of FIG. 2). Each RFID tag is attached to a product directly or indirectly (e.g., products 220, 230, 240 and 250 of FIG. 2). The product identification information can be received using, for example, an RFID reader (e.g., RFID reader 300).

At step 406, one or more characteristics associated with each of the products can be determined based on the product identification information or other data received from the RFID tags, such as discussed above. At step 408, the location of any first product relative to one or more other products each having at least one different characteristic than the first product can be identified. For instance, any product having a characteristic that is different from at least two other products in the same location may be identified as misplaced or orphaned. For example, referring to FIG. 2, items 240 and 250 (one of each) have different characteristics (women's jeans, playing cards) than items 220 (men's jeans, quantity of eight) and 230 (men's jeans, quantity of five). Accordingly, items 240 and 250 can each be identified as misplaced or orphaned. At step 410, information about the first product (e.g., product name, SKU number, or other identifying information) can be displayed to a user, for instance on the display 320 of the RFID reader 300. At step 412, process 400 ends.

In one embodiment, at step 414, the location of the first product can be identified. For example, the location of the misplaced or orphaned can be determined based on the usual location of the other items that are not identified as misplaced or orphaned. For instance, in the above example, items 240 and 250 were identified as misplaced or orphaned based on the presence of more than two each of items 220 and 230. Therefore, because the location of items 240 and 250 is the same as the location of items 220 and 230, and the usual location of items 220 and 230 is on shelf 210, the location of items 240 and 250 is also shelf 210. This location information may be useful, for example, when the information about the misplaced or orphaned products is displayed, at step 416, at a location other than the display of the RFID reader 300 (e.g., if the RFID reader is mobile), such as at a user terminal in a back office of the retail store 100 or other location remote from shelf 210.

While embodiments have been discussed in the context of misplaced products in an retail environment, it will be appreciated that some embodiments may be used in a similar manner in other environments, such as warehousing, distribution, shipping, storage, or any other environment in which products or other objects having RFID tags may be tracked. For example, some embodiments may be used to identify misplaced medical supplies in a hospital, misplaced cargo on a vessel, pallets at a distribution center, and/or animals in a shelter that have been caged in an incorrect location. It will also be appreciated that, in some embodiments, the RFID tags may be attached to, for example, product packaging or shipping containers rather than, or in addition to, being attached directly to individual units of a product.

A variety of commercially available RFID tags, readers and integrated circuits are contemplated for use with various embodiments. For example, RFIC suppliers may include NXP Semiconductors N.V. of Eindhoven, The Netherlands, Impinj of Seattle, Wash., and Alien Technology of Morgan Hill, Calif. In some embodiments, the RFID tags 260 can be embedded, adhered or inlayed onto label material attached to each product.

Figure 5:
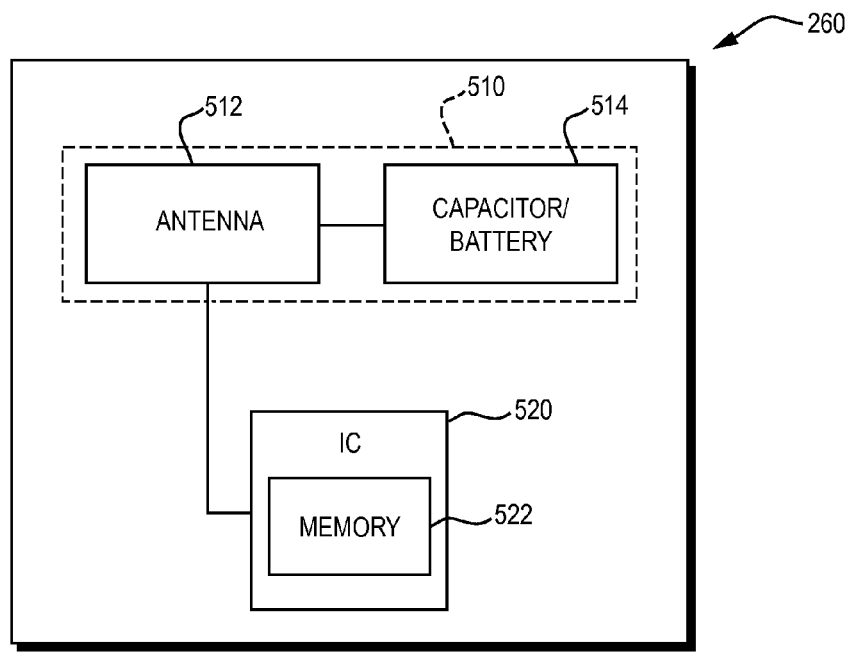
FIG. 5 is an example block diagram of an RFID tag for use with some embodiments.

FIG. 5 is a block diagram of an example of the RFID tag 260 of FIG. 2, which is suitable for use with various embodiments. The RFID tag 260 includes a passive resonant radio frequency (RF) circuit 510 for use in detecting when the tag 260 is within proximity of a reading range of a reader or interrogator, such as RFID reader 300 of FIG. 3. One example of the circuit 510 includes a coil antenna 512 and a capacitor or battery 514, which together form a resonant circuit with a predetermined resonant frequency, i.e., a selected radio frequency. Power for the RFID tag 260 is derived from the antenna 512 in the case where the tag is passive, or from the battery 514 where the tag is active or semi-passive. Furthermore, the RFID tag 260 includes an integrated circuit (IC) 520 for providing processing capabilities to the tag, as will be understood by one of skill in the art. The IC 520 is operatively coupled to the circuit 510. The IC 520 may, for example, include a programmable memory 522, such as a 96 bit memory, for storing identification data. It will be appreciated that other RFID tag designs may be used with certain embodiments, and embodiments are not limited to the particular tag design 260 described herein. For instance, the capacitor 514 may be located on the IC 520, with only an inductor coil (i.e., the antenna 512) being outside the IC 520.

The IC 520 can be configured to output a data stream of the data stored in the memory 522 when sufficient power is applied to the RFID tag 260. In one embodiment, the data stream creates a series of data pulses by switching an extra capacitor (not shown) across the coil antenna 512 over a period of time. This changes the resonant frequency of the RF circuit 510, detuning it from the operational frequency. Thus, instead of the RF circuit 510 returning a simple response signal, it returns, for example, a signal containing a packet of preprogrammed information (e.g., the identification data). The packet of data is received and processed by interrogator receiving circuitry and is decoded (if necessary) to provide identification information about the item 220, 230, 240, 250 to which the RFID tag 260 is attached. Other methods of using the data in the IC memory 522 to output identification data from the tag 260 are contemplated and the above embodiment is not intended to be limiting. The IC 520 may be a passive device and is powered in the same manner as the RF circuit 510 (i.e., by using energy received at the antenna 512 from the RFID reader 300 transmitter signal). Other types of RFID tags may be used. In some embodiments, the RFID tags 260 are not reused; that is, they are not removed from the product when the product is sold or otherwise disposed of; however, in some embodiments the RFID tags 260 may be reused.

Figure 6:
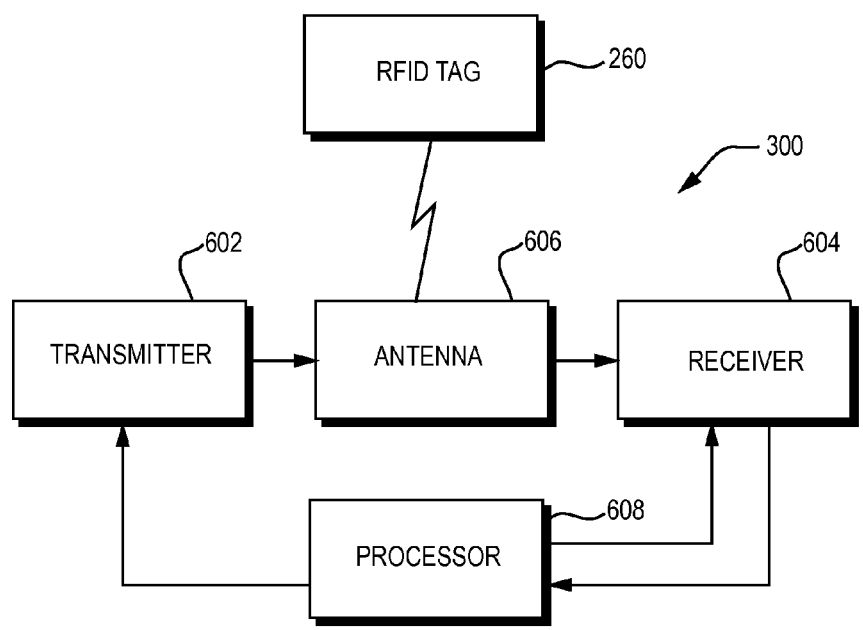
FIG. 6 is an example functional block diagram of an RFID reader for use with some embodiments.

FIG. 6 is a block diagram of an example of the RFID reader 300 of FIG. 3, which is suitable for use with the RFID tag 260 described with respect to FIG. 5. The RFID reader 300 and the RFID tag 260 can communicate by radio. The RFID reader 300 includes a transmitter 602, receiver 604, antenna 606, and data processing and control circuitry 608. An output of the transmitter 602 is operatively coupled to an input of the antenna 606. An output of the antenna 606 is operatively coupled to an input of the receiver 604. Outputs of the data processing and control circuitry 608 are operatively coupled to an input of the transmitter 602 and to an of the receiver 604, respectively. An output of the receiver 604 is operatively coupled to an input of the data processing and control circuitry 608.

Figure 7:
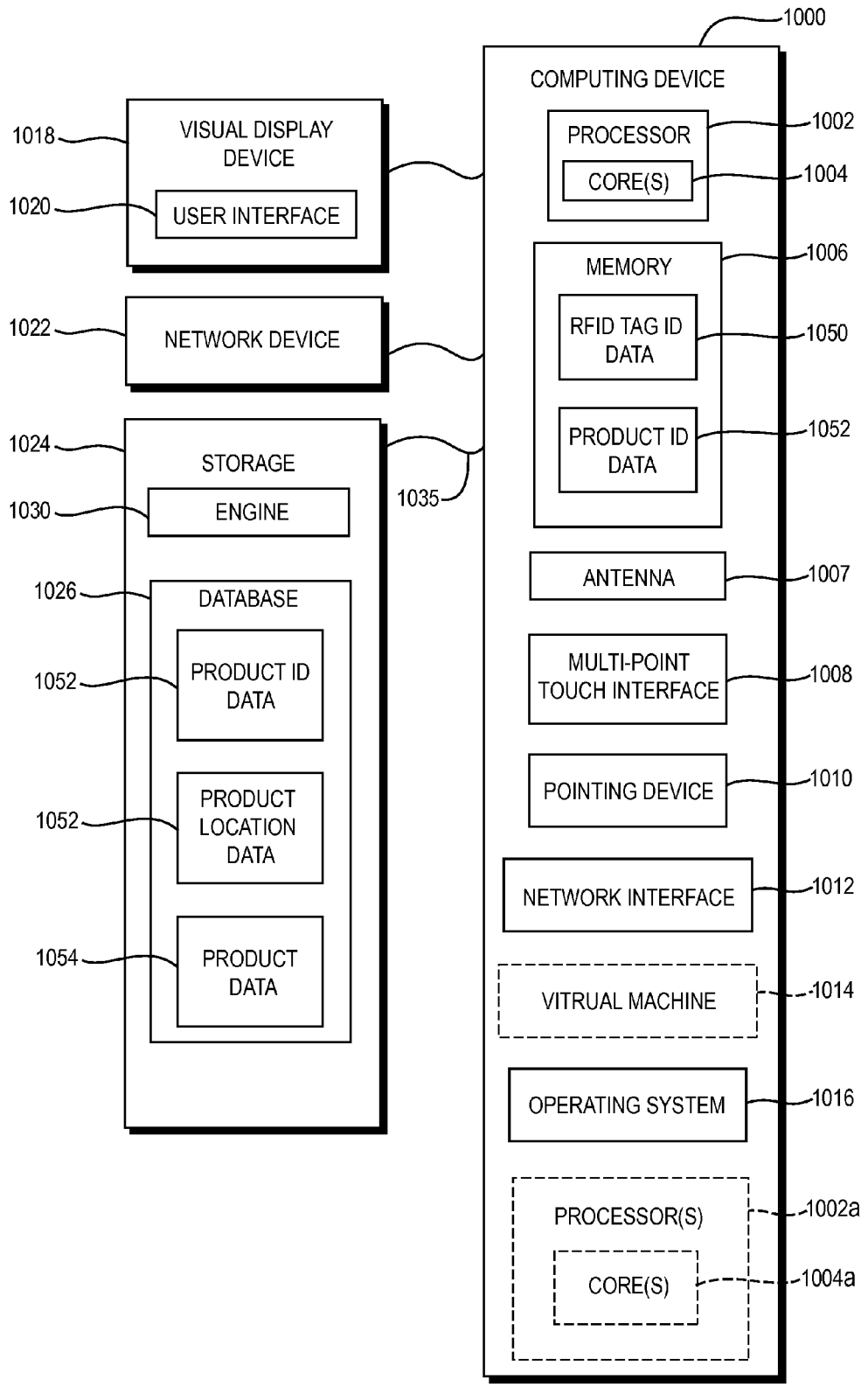
FIG. 7 is an example block diagram of a misplaced or orphan product identification system for carrying out one or more embodiments.

FIG. 7 is a block diagram of an inventory management system configured in an exemplary computing device 1000 that may be used to implement exemplary embodiments described herein. In some embodiments, the computing device 1000 is included in an RFID reader (such as RFID reader 300 of FIG. 3), back office system and/or other computing resource. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store non-transitory computer-readable and computer-executable instructions or software for implementing exemplary embodiments, such as process 400 (described above with respect to FIG. 4) of identifying misplaced or orphaned products. The computing device 1000 also includes configurable and/or programmable processor 1002 and associated core 1004, and optionally, one or more additional configurable and/or programmable processor(s) 1002a and associated core(s) 1004a (for example, in the case of computer systems having multiple processors/cores), for executing non-transitory computer-readable and computer-executable instructions or software stored in the memory 1006 and other programs for controlling system hardware. Processor 1002 and processor(s) 1002a may each be a single core processor or multiple core (1004 and 1004a) processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof. Memory 1006 may be used to store information such as RFID tag identification data 1050, product identification data 1052, product data 1054 (e.g., information about the characteristics of the product), and/or any other information.

A user may interact with the computing device 1000 through a visual display device 1018, such as a computer monitor or touch screen display integrated into the computing device 1000, which may display one or more user interfaces 1020 (e.g., the display 320 of FIG. 3) that may be provided in accordance with exemplary embodiments. The computing device 1000 may include other I/O devices for receiving input from a user or data from an RFID tag, for example, an antenna 1007, a keyboard or any suitable multi-point touch interface 1008, or a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other non-transitory computer-readable media, for storing data and non-transitory computer-readable instructions and/or software that implement exemplary embodiments described herein. The storage devices 1024 may be integrated with the computing device 1000. The computing device 1000 may communicate with the one or more storage devices 1024 via a bus 1035. The bus 1035 may include parallel and/or bit serial connections, and may be wired in either a multi-drop (electrical parallel) or daisy-chain topology, or connected by switched hubs, as in the case of USB. Exemplary storage device 1024 may also store one or more databases 1026 for storing any suitable information required to implement exemplary embodiments. For example, exemplary storage device 1024 can store one or more databases 1026, for storing information, such as product identification information, product characteristics, and/or any other information. The storage device 1024 can also store an engine 1030 including logic and programming for identifying misplaced or orphaned products, and for performing one or more of the exemplary methods disclosed herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as an RFID reader, workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 8:
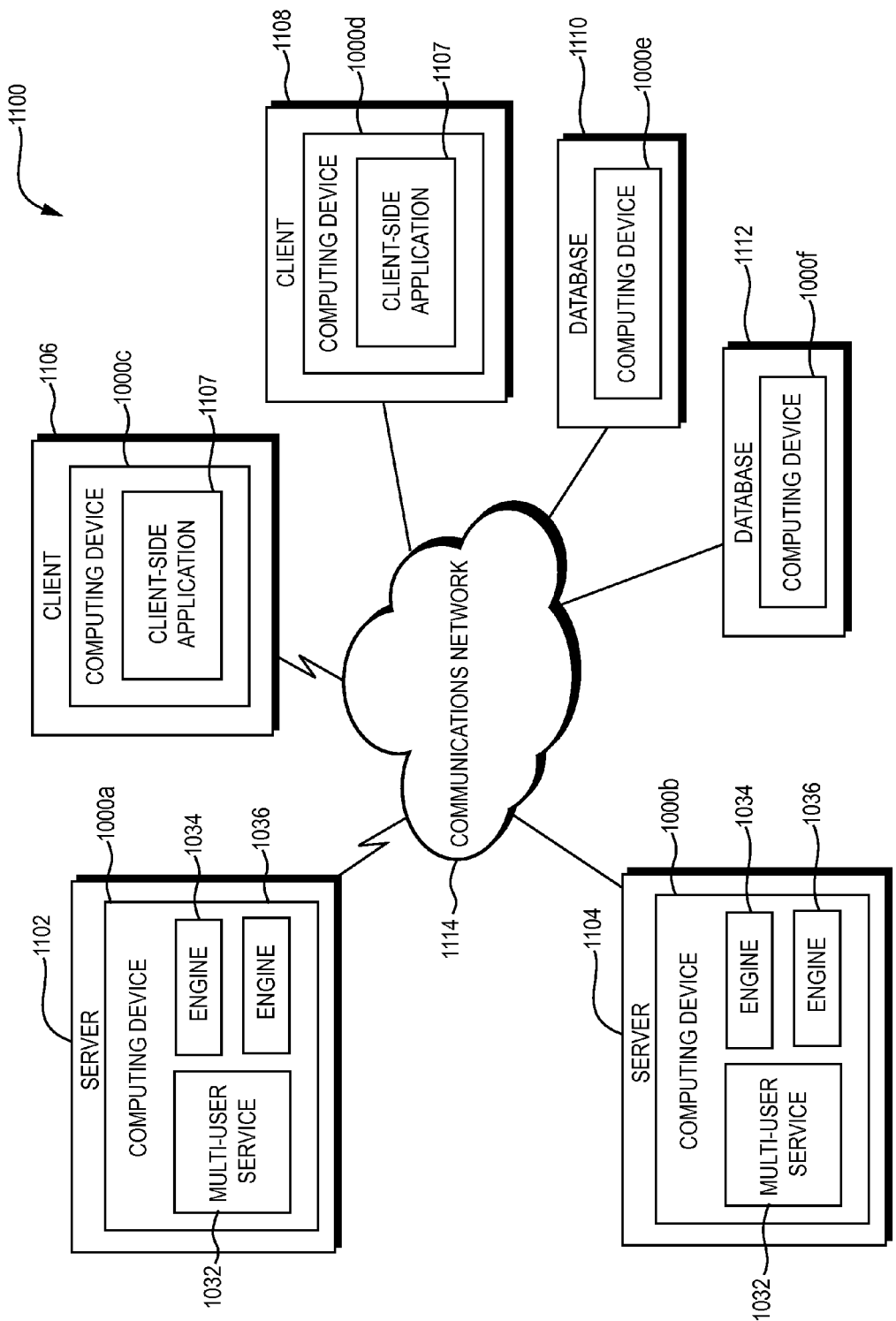
FIG. 8 is an example block diagram of a client-server misplaced or orphaned product identification environment for implementing one or more embodiments.

FIG. 8 is a block diagram of an exemplary network environment 1100 suitable for a distributed implementation of exemplary embodiments of an inventory management system, methods and non-transitory computer-readable media. The network environment 1100 may include one or more servers 1102 and 1104, one or more clients 1106 and 1108, and one or more databases 1110 and 1112, each of which can be communicatively coupled via a communication network 1114. The servers 1102 and 1104 may take the form of or include one or more computing devices 1000a and 1000b, respectively, that are similar to the computing device 1000 illustrated in FIG. 7. The clients 1106 and 1108 may take the form of or include one or more computing devices 1000c and 1000d, respectively, that are similar to the computing device 1000 illustrated in FIG. 7. For example, clients 1106 and 1108 may include mobile user devices. Similarly, the databases 1110 and 1112 may take the form of or include one or more computing devices 1000e and 1000f, respectively, that are similar to the computing device 1000 illustrated in FIG. 7. While databases 1110 and 1112 have been illustrated as devices that are separate from the servers 1102 and 1104, those skilled in the art will recognize that the databases 1110 and/or 1112 may be integrated with the servers 1102 and/or 1104 and/or the clients 1106 and 1108.

The network interface 1012 and the network device 1022 of the computing device 1000 enable the servers 1102 and 1104 to communicate with the clients 1106 and 1108 via the communication network 1114. The communication network 1114 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1114 are capable of supporting distributed implementations of exemplary embodiments.

In exemplary embodiments, one or more client-side applications 1107 may be installed on client 1106 and/or 1108 to allow users of client 1106 and/or 1108 to access and interact with a multi-user service 1032 installed on the servers 1102 and/or 1104. For example, the users of client 1106 and/or 1108 may include users associated with an authorized user group and authorized to access and interact with the multi-user service 1032. In some embodiments, the servers 1102 and 1104 may provide client 1106 and/or 1108 with the client-side applications 1107 under a particular condition, such as a license or use agreement. In some embodiments, client 1106 and/or 1108 may obtain the client-side applications 1107 independent of the servers 1102 and 1104. The client-side application 1107 can be computer-readable and/or computer-executable components or products, such as computer-readable and/or computer-executable components or products for presenting a user interface for a multi-user service. One example of a client-side application is a web browser configured to display a web page containing the report data 124 and/or the workload estimate 126, the web page being hosted by the server 1102 and/or the server 1104, which may provide access to the multi-user service. Another example of a client-side application is a mobile application (e.g., a smart phone or tablet application) that can be installed on client 1106 and/or 1108 and can be configured and/or programmed to access a multi-user service implemented by the server 1102 and/or 1104. The servers 1102 and 1104 can also provide one or more engines 1034, 1036 including logic and programming for receiving the product identification data 1052 and/or other data (e.g., product location data), for performing one or more of the exemplary methods disclosed herein.

The databases 1110 and 1112 can store user information, manifest data, report data and/or any other information suitable for use by the multi-user service 1032. The servers 1102 and 1104 can be programmed to generate queries for the databases 1110 and 1112 and to receive responses to the queries, which may include information stored by the databases 1110 and 1112.

Having thus described several exemplary embodiments of the disclosure, it is to be appreciated various alterations, modifications, and improvements will readily occur to those skilled in the art. For example, it is contemplated that any item, product or good having an RFID tag associated with it can be the object of the disclosed systems and methods. Accordingly, the foregoing description and drawings are by way of example only.

What is claimed is:

1. A computer-implemented method of managing inventory, comprising:
   receiving, at an antenna operatively coupled to a radio-frequency identification (RFID) reader, product identification information encoded in a first RF signal transmitted by a plurality of RFID tags associated with a plurality of first products at a first location;
   receiving, at the antenna, product identification information encoded in a second RF signal transmitted by one or more RFID tags associated with one or more second products at the first location;
   analyzing, by a processor, the first RF signal to identify a first product characteristic common to the plurality of first products based on the product identification information encoded in the first RF signal;
   analyzing, by the processor, the second RF signal to identify a second product characteristic different from the first product characteristic and associated with the one or more second products based on the product identification information encoded in the second RF signal; and
   identifying, by the processor, a data pattern from the first product characteristic and the second product characteristic, the data pattern identifying that the plurality of first products comprise a majority of all products at the first location based on the first product characteristic, and indicating that the one or more second products are incorrectly co-located at the first location with the plurality of first products based on the difference between the second product characteristic and the first product characteristic.

2. The computer-implemented method of claim 1, wherein the first product characteristic or the second product characteristic includes at least one of a product stock keeping unit (SKU) number, a manufacturer product number, a brand identifier, a model identifier, a product category, a department number, a package quantity, a pack type identifier, a style, a season, a size, and a color.

3. The computer-implement method of claim 1, further comprising displaying, by the processor via a display, information representing at least one item having the first product characteristic different from the second product characteristic.

4. The computer-implemented method of claim 3, wherein the product identification information includes at least one of a product stock keeping unit (SKU) number, a manufacturer product number, a brand identifier, a model identifier, and a product name.

5. The computer-implemented method of claim 1, wherein the product identification information is read over a predetermined period of time.

6. The computer-implemented method of claim 1, further comprising identifying a misplaced product in response to identifying one or more data patterns from the first product characteristic and the second product characteristic, wherein identifying the misplaced product includes employing pattern matching using the first and second characteristics to determine whether the misplaced product is associated with the plurality of first products or the one or more second products.

7. An inventory management system comprising:
   a programmable processor; and
   a memory operatively coupled to the processor, the memory having stored thereon computer-executable instructions that when executed by the processor cause the processor to:
      receive, at an antenna operatively coupled to a radio-frequency identification (RFID) reader, product identification information encoded in a first RF signal transmitted by a plurality of RFID tags associated with a plurality of first products at a first location;
      receive, at the antenna, product identification information encoded in a second RF signal transmitted by one or more RFID tags associated with one or more second products at the first location;
      analyze the first RF signal to identify a first product characteristic common to the plurality of first products based on the product identification information encoded in the first RF signal;
      analyze the second RF signal to identify a second product characteristic different from the first product characteristic and associated with the one or more second products based on the product identification information encoded in the second RF signal; and
      identify a data pattern from the first product characteristic and the second product characteristic, the data pattern identifying that the plurality of first products comprise a majority of all products at the first location based on the first product characteristic, and indicating that the one or more second products are incorrectly co-located at the first location based on the difference between the second product characteristic and the first product characteristic.

8. The system of claim 7, wherein the first product characteristic or the second product characteristic includes at least one of a product stock keeping unit (SKU) number, a manufacturer product number, a brand identifier, a model identifier, a product category, a department number, a package quantity, a pack type identifier, a style, a season, a size, and a color.

9. The system of claim 7, wherein the memory further comprises instructions that when executed by the processor cause the processor to display, via a display, information representing at least one item having the first product characteristic different from the second product characteristic.

10. The system of claim 9, wherein the product identification information includes at least one of a product stock keeping unit (SKU) number, a manufacturer product number, a brand identifier, a model identifier, and a product name.

11. The system of claim 7, wherein the product identification information is read over a predetermined period of time.

12. The system of claim 7, wherein the memory further comprises instructions that when executed by the processor cause the processor to identify a misplaced product in response to identifying one or more data patterns from the first product characteristic and the second product characteristic, wherein the misplaced product is identified by employing pattern matching using the first and second characteristics to determine whether the misplaced product is associated with the plurality of first products or the one or more second products.

13. A non-transitory computer-readable medium having stored thereon computer-executable instructions that when executed by a processor cause the processor to:

receive, at an antenna operatively coupled to a radio-frequency identification (RFID) reader, product identification information encoded in a first RF signal transmitted by a plurality of RFID tags associated with a plurality of first products at a first location;

receive, at the antenna, product identification information encoded in a second RF signal transmitted by one or more RFID tags associated with one or more second products at the first location;

analyze the first RF signal to identify a first product characteristic common to the plurality of first products based on the product identification information encoded in the first RF signal;

analyze the second RF signal to identify a second product characteristic different from the first product characteristic and associated with the one or more second products based on the product identification information encoded in the second RF signal; and identify a data pattern from the first product characteristic and the second product characteristic, the data pattern identifying that the plurality of first products comprise a majority of all products at the first location based on the first product characteristic, and indicating that the one or more second products are incorrectly co-located at the first location with the plurality of first products based on the difference between the second product characteristic and the first product characteristic.

14. The non-transitory computer-readable medium of claim 13, wherein the first product characteristic or the second product characteristic includes at least one of a product stock keeping unit (SKU) number, a manufacturer product number, a brand identifier, a model identifier, a product category, a department number, a package quantity, a package identifier, a style, a season, a size, and a color.

15. The non-transitory computer-readable medium of claim 13, further comprising instructions that when executed by the processor cause the processor to display, via a display, information representing at least one item having the first product characteristic different from the second product characteristic.

16. The non-transitory computer-readable medium of claim 15, wherein the product identification information includes at least one of a product stock keeping unit (SKU) number, a manufacturer product number, a brand identifier, a model identifier, and a product name.

17. The non-transitory computer-readable medium of claim 13, further comprising instructions that when executed by the processor cause the processor to identify a misplaced product in response to identifying one or more data patterns from the first product characteristic and the second product characteristic, wherein the misplaced product is identified by employing pattern matching using the first and second characteristics to determine whether the misplaced product is associated with the plurality of first products or the one or more second products.

* * * * *